United States Patent
McFarlane et al.

(10) Patent No.: US 8,401,945 B2
(45) Date of Patent: Mar. 19, 2013

(54) RATE BENCHMARKING TOOL FOR FEE-BASED AND MANAGED ACCOUNTS

(75) Inventors: Sarah McFarlane, Toronto (CA); Milen Kovachev, Toronto (CA); Nic Santean, Toronto (CA); Patrick Kennedy, Toronto (CA)

(73) Assignee: PriceMetrix, Inc., Toronto, Ontario (CA)

( * ) Notice: Subject to any disclaimer, the term of this patent is extended or adjusted under 35 U.S.C. 154(b) by 0 days.

(21) Appl. No.: 12/940,653

(22) Filed: Nov. 5, 2010

(65) Prior Publication Data

US 2012/0116991 A1    May 10, 2012

(30) Foreign Application Priority Data

Oct. 21, 2010 (CA) ..................... 2718230

(51) Int. Cl.
*G06Q 40/00* (2012.01)
*G06Q 30/00* (2012.01)
(52) U.S. Cl. .............. 705/35; 705/7.35; 705/36 R
(58) Field of Classification Search ............... 705/36 R, 705/7.35, 35
See application file for complete search history.

(56) References Cited

U.S. PATENT DOCUMENTS

| | | | |
|---|---|---|---|
| 6,782,093 B2 | 8/2004 | Uckun | |
| 6,990,236 B2 | 1/2006 | Boettcher | |
| 6,995,768 B2 | 2/2006 | Jou et al. | |
| 7,028,006 B1* | 4/2006 | Marsden et al. | 705/36 R |
| 7,203,655 B2 | 4/2007 | Herbert et al. | |
| 7,389,276 B1 | 6/2008 | Barnard et al. | |
| 7,412,402 B2 | 8/2008 | Cooper | |
| 7,483,847 B1* | 1/2009 | Rymer et al. | 705/35 |
| 2002/0016759 A1* | 2/2002 | Macready et al. | 705/37 |
| 2005/0246257 A1* | 11/2005 | Zhang | 705/35 |
| 2008/0097886 A1* | 4/2008 | Trott et al. | 705/37 |
| 2009/0150426 A1* | 6/2009 | Cannon et al. | 707/102 |
| 2010/0191666 A1* | 7/2010 | Trott et al. | 705/36 R |
| 2010/0325063 A1* | 12/2010 | Stone | 705/36 R |

FOREIGN PATENT DOCUMENTS

CA    2690312    1/2010

OTHER PUBLICATIONS

U.S. Appl. No. 12/359,277, filed Jan. 23, 2009, Trott.

* cited by examiner

*Primary Examiner* — Kenneth Bartley

(57) ABSTRACT

A computer for displaying an evaluation tool for evaluating a proposed fee on behalf of a professional, including a memory having at least one region for storing computer executable program code and a processor for executing the program code stored in the memory. The program code includes code for receiving a product type for a proposed client account, a proposed fee for the proposed client account, and at least one of the following numerical parameters: (i) an account asset amount for the proposed client account, (ii) a relationship asset amount for the proposed client account, and (iii) a breakdown of components in an asset mix for the proposed client account. A range of historical fees of the nearest neighbor historical accounts is shown on a graph from lowest to highest, and the proposed fee is shown on the graph relative to the nearest neighbor historical fees.

20 Claims, 8 Drawing Sheets

FeeCheck™

Use FeeCheck to see what other advisors at your firm and in the market charge for similar fee and managed accounts.

Tell us about your client...

Product type: | Premium Product ▽
Relationship assets: | $1,000,000
Account assets: | $500,00

Portfolio composition:
- Equity: 50 %
- Fixed Income: 20 %
- Mutual Funds: 30 %
- Cash: 0 %

Proposed RoA (fee): 1.00 % ($5000)
● One fee  ○ Fee by portfolio component

Compare me to: ● Us Market  ○ My Firm
⊞ Narrow the comparison universe to advisors like you (optional)

[Reset]  [Calculate]

FIG. 4

RATE BENCHMARKING TOOL FOR FEE-BASED AND MANAGED ACCOUNTS

CROSS REFERENCE TO RELATED APPLICATION

This application claims priority from Canadian Patent Application No. 2,718,230 filed on Oct. 21, 2010, which is incorporated by reference in its entirety herein.

FIELD OF THE INVENTION

The invention relates to fee-setting methods, and more particularly relates to methods of informing professionals to allow them to better set their own fees for professionally-managed accounts.

BACKGROUND OF THE INVENTION

In the financial services industry, a professional providing financial advisory services for fee-based or managed accounts has discretion over the price (i.e. the professional's fee) charged to the client for the professional's services. Ultimately, the price charged by the professional must be within the market-acceptable boundaries, or clients will go elsewhere. However, if the price charged is too low, the professional may not be earning the maximum amount of per account revenue available to the professional.

While the discretion over pricing allows professionals much freedom to reward client loyalty, or encourage new business or more desirable business, many financial advisors with such discretion find it a source of difficulty and frustration. In practice, many of these professionals do not have a reliable sense of how they themselves price their services relative to others and are uninformed as to the actual pricing behavior of their competitors (even within the same firm). Ideally, a professional should be able to charge a client "what the market will bear" but this is difficult without accurate and up-to-date information on the state of the market. There is also pressure on professionals or particular firms to maximize revenue by charging higher prices. However, with little reliable guidance, it is difficult for a professional to know how to adopt a pricing strategy that is revenue-maximizing, bearing in mind his own client, asset and product variables, as well as, being competitive with the professional's peers.

Transaction pricing information has started to become available. Professionals can now use reports of their past pricing behavior for transactions and evaluate their pricing against prices charged by their peers (e.g. U.S. Pat. No. 7,028,006) or against reference prices based on historical transaction data (e.g. US Published Patent Application No. 2008/0097886 A1). However, it would be desirable to make comparison data for fee-based and managed accounts available in a simple visual format. This would further allow the professional to evaluate the proposed pricing in light of the specifics of the account and comparison data with similar historical (i.e. existing) accounts and consider various pricing (fee-setting) scenarios.

SUMMARY OF THE INVENTION

A method of displaying an evaluation tool is provided for evaluating a proposed fee on behalf of a professional. On a first computer, an input is received of a product type for a proposed client account, and at least one numerical parameter selected from the group consisting of: (i) an account asset amount for the proposed client account, (ii) a relationship (or household) asset amount for the proposed client account, and (iii) a breakdown of components in an asset mix for the proposed client account. An input is also received of a proposed fee for the proposed client account. On a processor of a second computer, in communication with the first computer, software is executed to (a) choose a subset of accounts from a historical accounts database stored at the second computer that corresponds to the product type; (b) identify and rank a plurality of nearest neighbor historical accounts from the subset of accounts in the historical accounts database based on the product type, and the least one numerical parameter, each historical account being associated with a historical fee; and (c) find the highest and lowest historical fees (having first eliminated outliers, as necessary) among the plurality of nearest neighbor historical accounts. From this information, a display graph is generated on the first computer wherein the range of fees of the nearest neighbor historical accounts is shown on the graph from lowest to highest. The proposed fee is displayed on the graph to allow the professional to evaluate the proposed fee relative to the nearest neighbor historical fees.

The "proposed account" and "proposed fee" may be actual or hypothetical accounts and fees for actual or hypothetical clients. One use of the method is to test out different pricing options for a professional's services before opening an account for a new client, or prior to pitching a new service.

The proposed fee and the historical fees may be expressed in terms of % of account assets. Alternatively, the proposed fee and the historical fees are expressed in terms of a dollar amount per account asset.

Preferably, the display graph further includes an indication of a top percentile (e.g. $75^{th}$, $80^{th}$) of the range of fees. If the proposed fee is below the top percentile, the difference between the lowest fee of the top percentile and the proposed fee may be calculated and displayed. If the proposed fee is expressed in terms of % of account assets or relationship assets, preferably the difference is displayed in dollars. If the proposed fee is below the median, the display graph may (alternatively, or in addition) show the "lift" to the median.

While various formats are possible for visually illustrating the position of the professional's proposed fee relative to the historical fees of the nearest neighbor accounts, preferably the graph is formatted as a bar gauge. The top percentile may be displayed in a different colour from the remainder of the graph. Preferably, the proposed fee is represented as a slidable marker on the gauge. In this case, the proposed fee can be changed by either modifying the input of the proposed fee, or sliding the slidable marker on the gauge. Preferably, modifying the input of the proposed fee, or sliding the slidable marker on the gauge will simultaneously change an indicator of the fee difference (in dollars or percentage, or both) between the proposed fee and the lowest fee of the top percentile.

In order to identify the nearest neighbor accounts, preferably several steps are followed:
  plotting the historical accounts of the same product type on a grid having multidimensional space, wherein each historical account is plotted according to at least one of the following dimensions: the account assets, the household assets, and the components of the asset mix;
  plotting the proposed account on the grid according to the same dimension(s) as the plotted historical accounts;
  picking historical accounts from the grid and calculating the normalized distance between the proposed account and the selected historical accounts; and selecting as the nearest neighbor historical accounts a subset of the historical accounts having the smallest normalized distance from the proposed account.

In order to come to a more harmonized picture of the nearest neighbors, certain historical accounts may be eliminated from consideration (or not considered) if they are outside a preset minimum or maximum value on any of the dimensions. Likewise, historical accounts may be eliminated (or not considered) if they are outside a preset minimum or maximum normalized distance (from the proposed account) on any one of the dimensions.

Further, at least one of the dimensions may be weighted in the calculation of the normalized distance (to emphasize a particular dimension relative to the others).

The historical accounts database comprises historical accounts within a single firm or from a plurality of firms. The user may be able to elect to compare the proposed account to historical accounts within a single firm or a plurality of firms.

The user may also be able to elect to only compare the proposed account to historical accounts of professionals similar to the professional. In this case, prior to step (b) (i.e. the nearest neighbor analysis), the historical accounts may be filtered on the basis of at least one of: book assets, book revenue, years of service or recognition level. (The user's own book assets, book revenue, years of service or recognition level may be input either at the time of the evaluation method, or they may be retrieved from prior entry or a stored profile.)

Preferably, the historical accounts database is presegmented to consider accounts only within the same country or within the same currency.

BRIEF DESCRIPTION OF THE FIGURES

FIG. 4 is a screen shot of the FeeCheck web application showing the input with a set of sample data.

DETAILED DESCRIPTION

The invention relates to a method of computer assisted modeling for use in evaluating a proposed fee. The computer system uses a display to show a professional where his proposed fee sits relative to a range of historical fees charged for similar accounts. This display application is sometimes described as a "FeeCheck" or "FeeCheck application" in the present description.

Figure 2A:
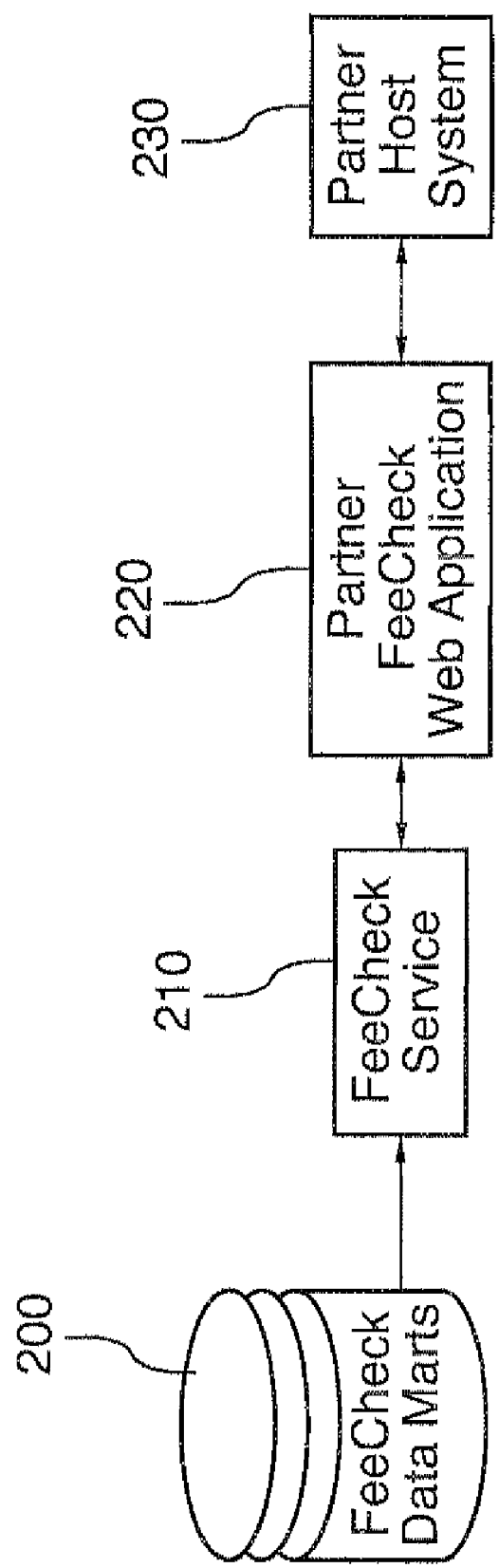
FIG. 2A is a diagram of one possible architecture of the FeeCheck as a hosted web application together with hosted data mart(s).
Figure 2B:
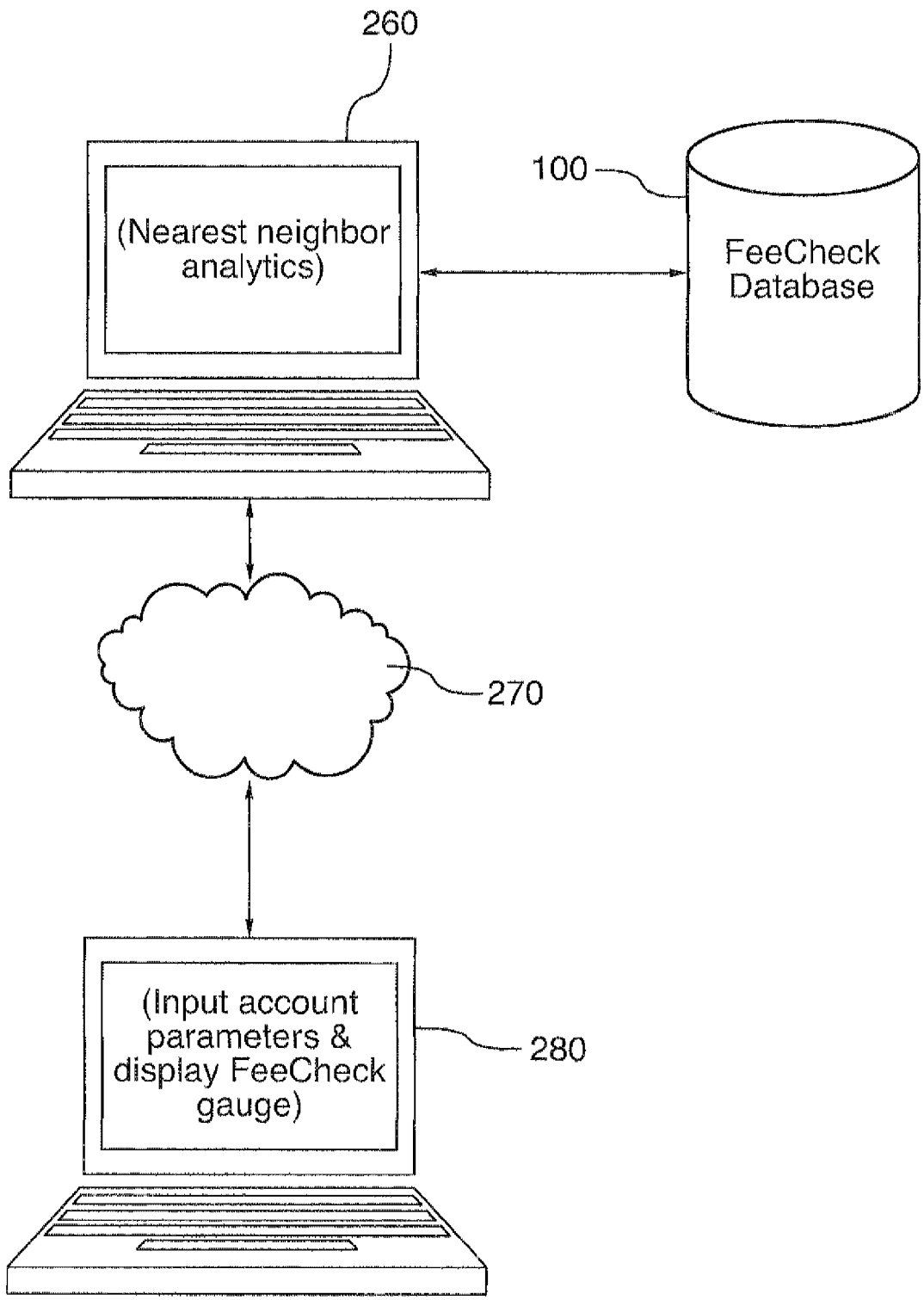
FIG. 2B is a simplified network diagram of the system.

The architecture of the system, in its simplest form, is shown in FIG. 2B. The display is generated on a first computer 280, which receives inputs from the professional of a proposed account. A second computer 260 finds historical fees charged for similar accounts having reference to a database (or multiple databases) of historical accounts 100. The second computer 260 accesses this database(s) and performs "nearest neighbor" analysis to feed relevant data to the first computer for display to the professional. The connection 270 between the first 280 and second 260 computers may be an Internet connection, or any other network connection.

One possible architecture of the calculator as a hosted web application is shown in FIG. 2A. The FeeCheck service 210 is a middle tier that serves a web application 220 to users. The FeeCheck service 210 accesses a pre-segmented data mart(s) 200, which may be a standard data mart or may be specifically customized for the particular partner. System 230 is a host system of the front end operated by the hosting firm (this could be the user's employer or a third party that provides the account entry technology).

The FeeCheck application can, for example, appear as a separate window or a portion of a window on a firm's account management system. In this way, data entered for a proposed account can be used by the FeeCheck application at the time the account is being structured, or term sheets are prepared for a new client. However, the application need not be structured this way, and may simply operate independently to allow the professionals of a firm to explore many pricing options hypothetically without entering the information into the firm's account databases or linking to actual account or client data.

Figure 1:
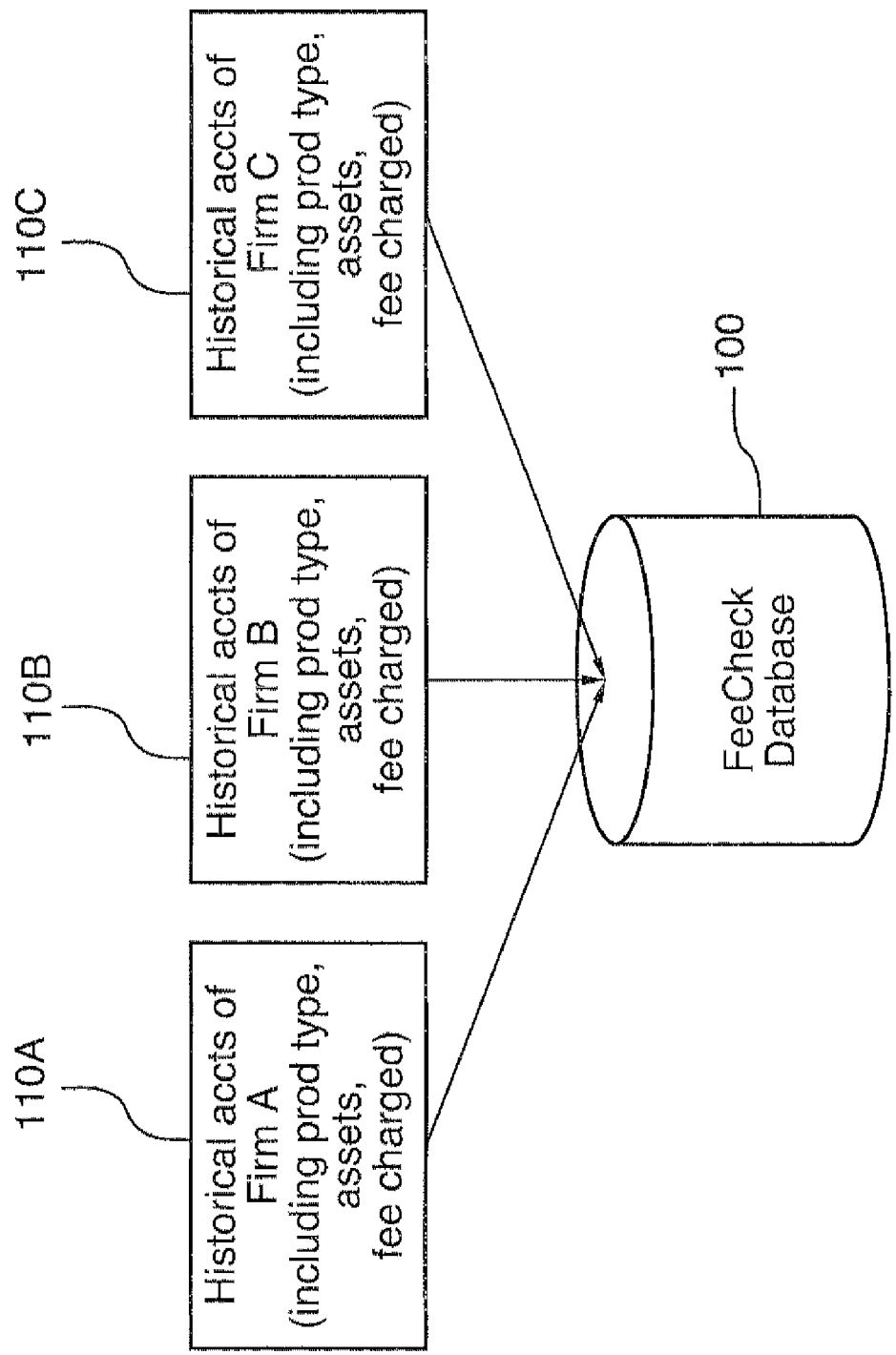
FIG. 1 is a diagram of the data sources of the FeeCheck database.

The FeeCheck database 100 is at the heart of the present application. This database or cluster of databases includes data on historical accounts, and the fees charged by the other professionals for the accounts. Historical account data from multiple organizations 110A, 110B, 110C is collected and stored together (as illustrated in FIG. 1).

Figure 6:
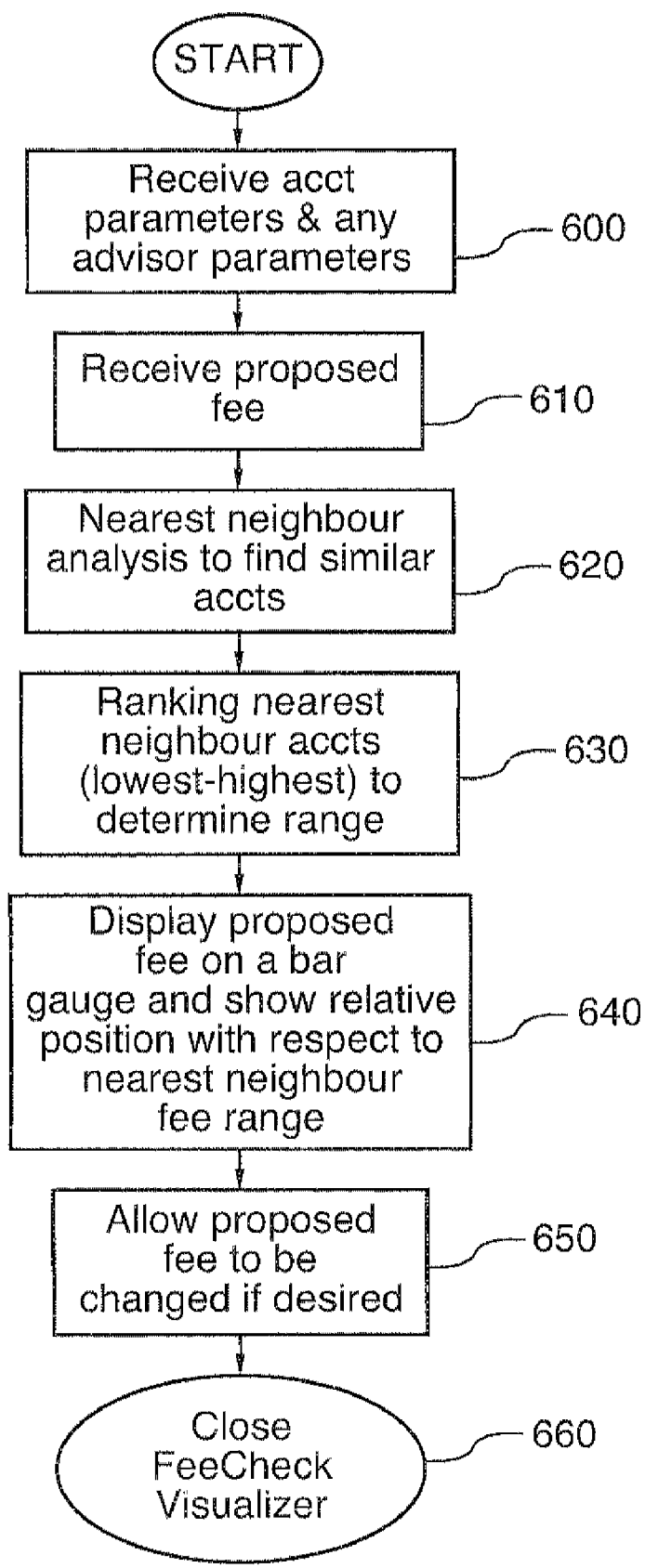
FIG. 6 is a flow diagram of the steps of evaluating a proposed fee for an account according to a preferred embodiment of the method.

The method is illustrated on a flow chart in FIG. 6. The system receives account parameters (and optionally advisor parameters) from the professional 600. Alternatively, the advisor parameters may be retrieved from another screen or from pre-entered data. Next, the system receives from the professional an input of the proposed fee 610. The account parameters entered at 600 are used in a nearest neighbor analysis 620 to find similar accounts using various parameters. (The specific account parameters and the preferred multidimensional nearest neighbor analysis is described in greater detail below.) These nearest neighbor accounts are ranked 630 according to the fees charged for those accounts to determine a range of applicable historical fees. This fee range is then displayed (preferably, on a bar gauge) and the proposed fee is indicated in its relative position along that range 640. Viewing his proposed fee relative to these historical fees may cause the professional to want to change his proposed fee to explore other options with the display. This can be done at step 650, before the FeeCheck is closed 660. In this way, the system provides an informed basis on which to price the professional's service for a particular proposed account, or to guide his pricing behavior generally (through exploration of hypothetical examples).

Figure 5:
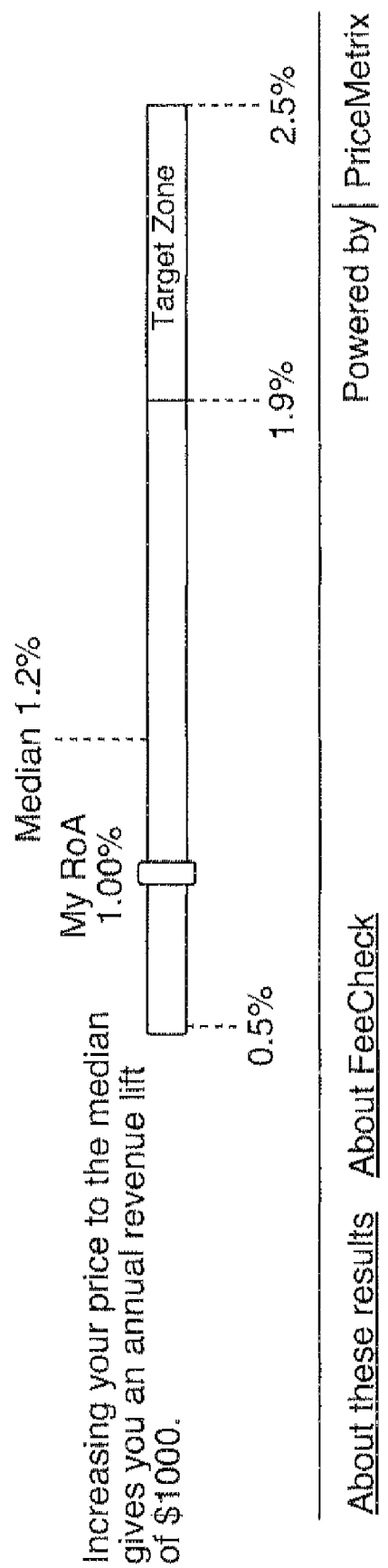
FIG. 5 is a screen shot of the resultant display graph for the data entered in FIG. 4.

Turning to FIG. 4 and FIG. 5, this process is illustrated with sample screen shots from the FeeCheck application. In FIG. 4, a sample proposed fee and account parameter entry is shown. As shown in FIG. 4, the product type (e.g. premium, managed account, fund wrap, advisor with discretion, advisor without discretion) and any combination of one or more of the following account parameters may be entered:

Relationship assets (the $ managed by the professional for this client or household across all accounts)

Account assets (the $ managed by the professional in this account)

Portfolio composition (asset mix of equity, fixed income, mutual funds, cash—by %)

The user enters a proposed fee ("RoA"—for "return on assets", or the revenue factor chargeable by the professional) for the account (either by % or $ for the whole account or broken out by portfolio (i.e. asset mix) component). A comparison universe is selected. For example, the comparison universe may be the professional's own firm, or the universe of all firms. Optionally, the user can elect to have the comparison universe narrowed to similar advisors (e.g. by length of service, size of book, or book revenue, or recognition). The "Calculate" button initiates the nearest neighbor fee ranging function, which generates the display in FIG. 5.

Based on the account parameters of the proposed account, a selection of nearest neighbor historical accounts is determined. These are ranked according to their fee %. The highest and lowest of these historical fees (here shown as %) form the top and bottom ends of the gauge in FIG. 5.

The "target zone" (which may be highlighted in a different contrasting color) represents the range between some pre-selected percentile and the top end of the near neighbor historical transactions. The median may also be displayed.

The proposed fee entered by the professional is shown on the graph as "My Fee" or "My RoA". If, as shown here, the "My Fee" amount is below the target zone, the professional can re-enter the proposed fee to an amount within the target zone. Alternatively, the professional can drag the "My Fee" indicator to another spot on the gauge (which may be within the target zone). Dragging the "My Fee" indicator will preferably automatically update the proposed fee field in FIG. 4. The target zone provides a visual motivational tool to prompt the professional to price his fee within a historically-realistic upper end of the price spectrum. However, the FeeCheck does not supersede or replace the professional's own discretion. The account can still proceed (and the client can still be charged) on the basis of a fee that is below the target zone.

On the screen, the professional may be advised that raising his proposed fee to the median (or to the "target zone") will result in a lift of x dollars. In the example, the lift amount is a function of the percent difference (median 1.2%–my RoA 1.0%=0.2%) multiplied by the account assets entered (i.e. $500,000), thus $1000 revenue. This lift amount is also preferably automatically adjusted as the "My Fee" indicator is dragged along to different positions the gauge.

If desired, the professional can also access additional information about the historical accounts that the system has analyzed at "About these Results". This may provide information, for example, about the number of firms, professionals or accounts in the sampled universe.

To understand how the fee range in FIG. 5 is arrived at, a more detailed explanation of the nearest neighbor analysis follows. The nearest neighbor analysis is used to solve the problem of determining what set of historical accounts are "similar" to the input account. This analysis has several layers—distance between accounts plotted in multidimensional hyperspace, improvements on the distance measurement to account for standard deviation (i.e. normalize the distance measurement) over the various dimensions, weighting to prioritize certain dimensions over others, and filters and constraints to add certain business rules to the analysis.

Figure 3A:
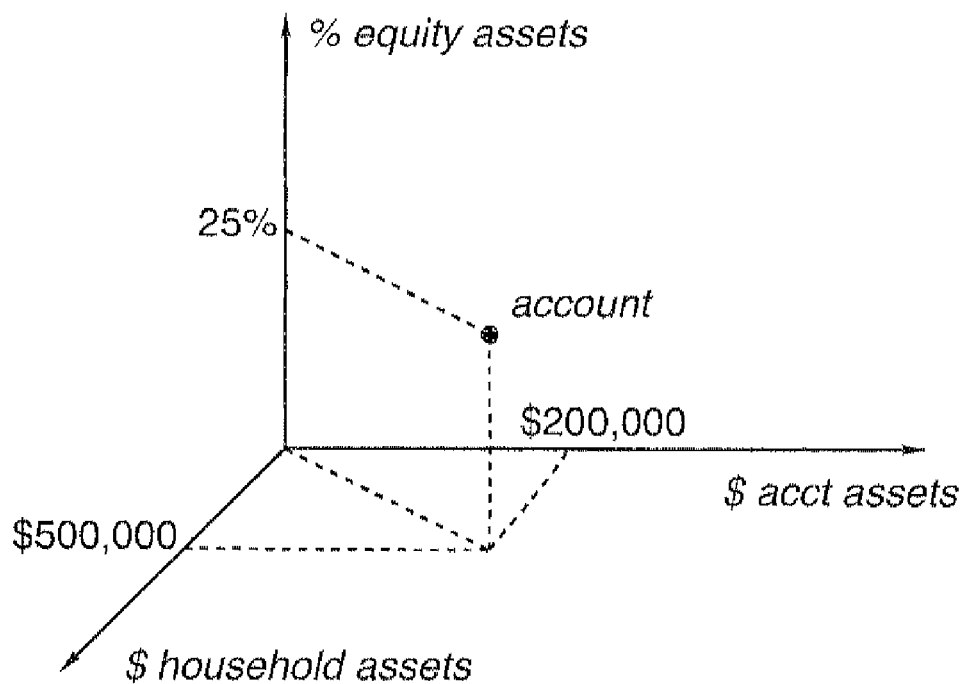
FIG. 3A is a simplified illustration of plotting an account on a grid in multidimensional (here, 3D) space.

To identify similar accounts a variety of dimensions of "similarity" can be considered, including:

1. total account assets
2. percentage of account assets in equity
3. percentage of account assets in fixed income
4. percentage of account assets in mutual funds
5. percentage of account assets in cash
6. advisor's book total assets
7. advisor's book total revenue
8. advisor's length of service
9. advisor's recognition level
10. total relationship (or household) assets
11. relationship assets in fee based accounts These can be viewed as coordinates in a multidimensional hyperspace, in which the input proposed account represents a "point". Looking at only three of these measures, a sample account is plotted in a three-dimensional grid in FIG. 3A.

When two or more points are plotted, the distance between any two of them can be measured. The basic formula for measurement of Euclidean Distance is:

$$d(\vec{x}, \vec{y}) = \sqrt{(x_1-y_1)^2 + (x_2-y_2)^2}$$

In multidimensional space, the formula is:

$$d(\vec{x}, \vec{y}) = \sqrt{\sum_{i=1}^{n}(x_i - y_i)^2}$$

where n is the number of dimensions of that space.

The distance from an input account to any historical account can be measured. Any other account that is close in distance to the input account is considered as "similar", and thus a nearest neighbor.

However, a basic Euclidean Distance measurement is not effective where the coordinates are not homogenous. In the example in FIG. 3A, consider the two coordinates: <% equity assets> and <household assets>. The measure units for these two coordinates are radically different: one is percentage, the other dollars, and the "variation" along <% equity assets> axis will be quite different from that along <household assets> axis.

Figure 3B:
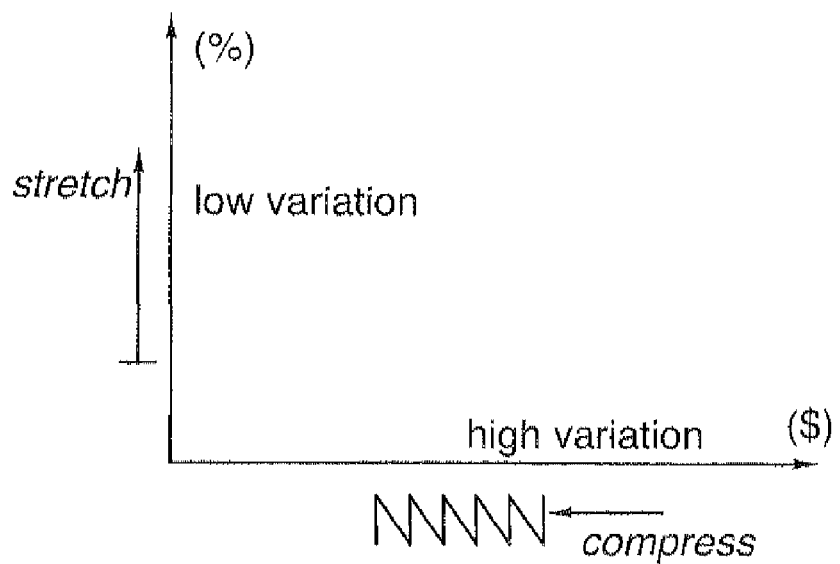
FIG. 3B is an illustration of normalization in a simplified two-dimensional grid.

A simpler example of how the heterogeneous coordinates are managed is illustrated in FIG. 3B. Two coordinates are shown with % and $ as units. We expect the values across % axis to fluctuate to a lesser degree than those across the $ axis. In order to "match" the two variations, we need to either "stretch" the space along the % coordinate, or "compress" the space along the $ coordinate.

By measuring the standard deviation σ of each dimension in the universe of historical accounts, the degree of variation along all axes can be established.

The "Normalized Euclidean Distance" can be used to achieve the desired effect of deforming the space along axes, according to the corresponding variation. The formula for the normalized Euclidean distance is $$d(\vec{x}, \vec{y}) = \sqrt{\sum_{i=1}^{n} \frac{(x_i - y_i)^2}{\sigma_i^2}}$$

Figure 3C:
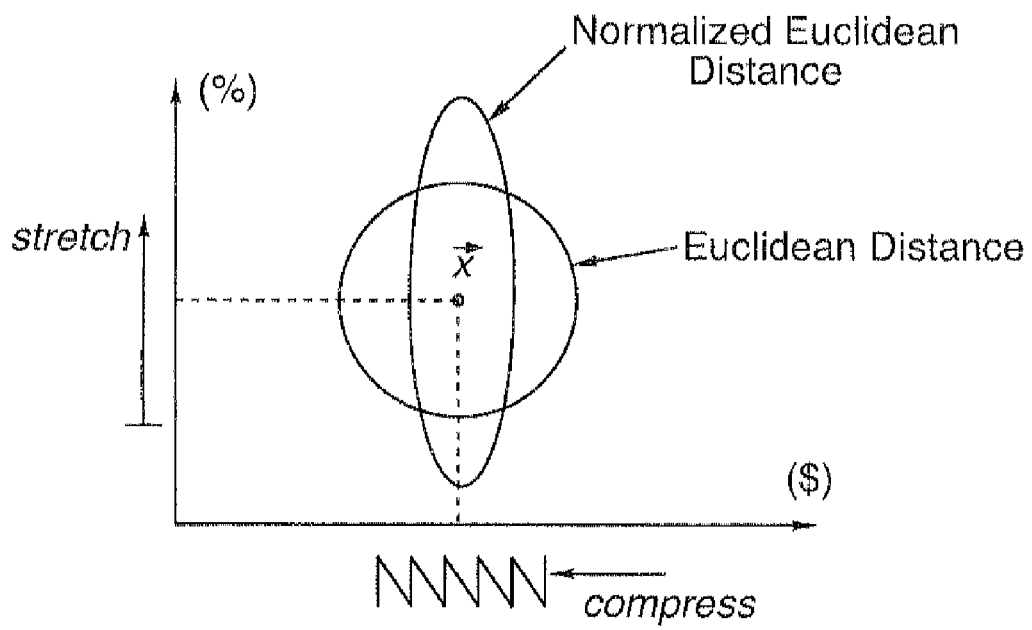
FIG. 3C is an illustration of "nearest neighborhood" with normalization and without.

The ellipse equation is part of this formula. The presence of standard deviation "distorts" the space across each coordinate, and the nearest neighborhood of a point will be distorted as well. As shown in FIG. 3C, the new nearest neighborhood will look like an ellipse rather than a circle.

Using the normalized Euclidean distance, the following steps can be carried out to allow computation of the nearest neighbors of an input account:

1. Analyze the universe of all historical accounts, and for every measure "i", generate the data set $S_i=\{a_1, a_2, \ldots, a_m\}$ of values provided by all historical accounts. For example, if the measure is "$ assets", then this series will consist of all asset values collected in these historical accounts.
2. For each data set $S_i=\{a_1, a_2, \ldots, a_m\}$ compute its standard deviation $\sigma_i$.
3. To compute the distance between any two accounts, the following formula is used:

$$d(\vec{x}, \vec{y}) = \sqrt{\sum_{i=1}^{n} \frac{(x_i - y_i)^2}{\sigma_i^2}},$$

where $\vec{x}$ and $\vec{y}$ denote the two accounts.

Thus, to compute the distance from the input account to all accounts in the system, this formula can be used.

4. Generate the list of all accounts ordered based on their calculated distance to the given account.
5. Keep from this list only the first (closest) accounts, which satisfy certain "proximity" criteria (explained in further detail below).

In order to make the normalized Euclidean distance more flexible, a "weight" factor can be introduced that allows the standard deviation to be tuned up and matched with certain business requirements. The weights "put emphasis" on some measures relative to others. For example, if for business reasons one wants to "weight"<$ account assets> more than <% of equity> when determining "similar" accounts, that these weights can be used to achieve this effect. Note that changing the weights will change the order of accounts with respect to the distance from the input account. For example, by putting less emphasis on <% of equity>, an account that was far from the input account as a consequence of a big difference in <%>, would now jump closer to the input account, because the difference in <%> has now a smaller impact on the overall distance.

The weighted normalized Euclidean distance formula becomes:

$$d(\vec{x}, \vec{y}) = \sqrt{\sum_{i=1}^{n} \frac{(x_i - y_i)^2}{\left(\frac{\sigma_i}{\alpha_i}\right)^2}}$$

where $\alpha_i$ is the weight meant to prioritize/emphasize the measure "i". The higher the weight factor, the less sensitive this measure is in the resulting distance. Weighting is possible but not required in the implementation of the invention.

Figure 3D:
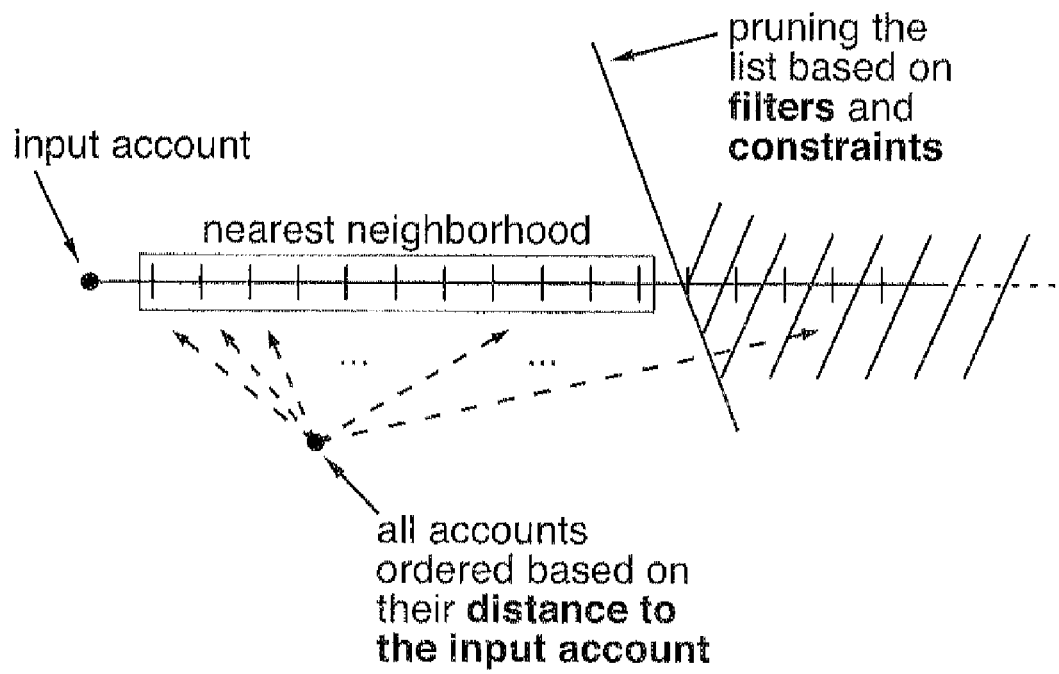
FIG. 3D is an illustration of filters and constraints applied to the process of identifying nearest neighbors.

The results are protected against wild swings and odd results from outliers by the use of proximity and filtering criteria. The proximity and filtering criteria enforce measure ranges and filter out accounts that fail to meet the min/max constraints on their measures. This is illustrated very simply in FIG. 3D.

For each account measure, a range is pre-specified within which a "similar account" must fall. For example: Account total assets: a "similar account" cannot have assets more than 15% greater or smaller than the input account.

Historical accounts can also be filtered to discard certain accounts that fail to meet certain pre-specified min/max criteria. For example: Advisor Book Assets: discard all accounts that belong to advisors whose book assets are smaller than some predefined constant AdvisorBookAssetsMin" or greater than "AdvisorBookAssetsMax". In practice, these filtering rules may be implemented before or after the distance measurements are taken and initial ranking is done. It is also possible to omit any filtering and constraints and simply pick and rank from the unfiltered historical accounts as they are found.

The foregoing description illustrates only certain preferred embodiments of the invention. The invention is not limited to the foregoing examples. That is, a person skilled in the art will appreciate and understand that modifications and variations or will be possible to utilize and carry out the teachings of the invention described herein. Accordingly all suitable modifications, variations and equivalence may be resorted to and such modifications, variations and equivalence are intended to fall within the scope of the invention as described and within the scope of the claims.

The invention claimed is:

1. A fee evaluation tool for evaluating a proposed fee on behalf of a professional, comprising:
   a first computer comprising:
      a first memory; and
      a first processor coupled to the first memory, the first processor for receiving fee parameters for a proposed client account, the fee parameters received by the first processor including:
      (a) a product type for the proposed client account,
      (b) a proposed fee for the proposed client account, and
      (c) at least one numerical parameter selected from the group consisting of:
         (i) an account asset amount for the proposed client account, (ii) a relationship asset amount for the proposed client account, and (iii) a breakdown of components in an asset mix for the proposed client account; and
   a second computer comprising:
      a second memory having a historical accounts database stored in the second memory; and
      a second processor coupled to the second memory, the second processor for receiving fee parameters from the first computer and retrieving historical account attributes from the database by:
      (a) choosing a subset of account records from the historical accounts stored in the database that corresponds to the product type defined by the fee parameters;
      (b) identifying and ranking a plurality of nearest neighbor historical accounts from the chosen subset of account records based on the at least one numerical parameter defined by the fee parameters, each historical account being associated with a historical fee; and
      (c) finding the highest and lowest historical fees among the plurality of nearest neighbor historical accounts;
      (d) transmitting to the first computer historical account attributes capable of display as a display graph showing a range of historical fees of the nearest neighbor historical accounts from lowest to highest and showing the proposed fee defined by the fee parameters relative to the nearest neighbor historical fees;
   wherein during identification of nearest neighbor historical accounts, the second processor:
      plots historical account records on a grid having multi-dimensional space, wherein each historical account record is plotted according to at least one of the following dimensions: the account assets, the household assets, and the components of the asset mix;

plots the proposed client account on the grid based on the same dimensions as the plotted historical account records;

calculates the normalized distance between the proposed client account and historical account records selected from the grid; and selects as the nearest neighbor historical account records a subset of the historical accounts having a determined smallest normalized distance from the proposed client account.

2. The evaluation tool of claim 1, wherein the proposed fee and the historical fees are expressed in terms of percent of account assets or relationship assets.

3. The evaluation tool of claim 1, wherein the proposed fee and the historical fees are expressed in terms of a dollar amount per account asset or relationship asset dollars.

4. The evaluation tool of claim 1, wherein the display graph further includes an indication of a top percentile of the range of fees.

5. The evaluation tool of claim 4, wherein the second processor calculates and displays the difference between the lowest fee of the top percentile and the proposed fee, when the proposed fee is below the top percentile.

6. The evaluation tool of claim 5, further comprising, code for displaying the difference in dollars, when the proposed fee is expressed in terms of percent of account assets or relationship assets.

7. The evaluation tool of claim 1, wherein the display graph is formatted as a bar gauge.

8. The evaluation tool of claim 4, wherein the top percentile is displayed in a different color from the remainder of the display graph.

9. The evaluation tool of claim 7, wherein the proposed fee is represented as a slidable marker on the gauge.

10. The evaluation tool of claim 9, wherein the proposed fee can be changed by either modifying the input of the proposed fee, or sliding the slidable marker on the gauge.

11. The evaluation tool of claim 10, wherein modifying the input of the proposed fee, or sliding the slidable marker on the gauge will simultaneously change an indicator of the fee difference between the proposed fee and the lowest fee of the top percentile.

12. The evaluation tool of claim 1, wherein historical account records are eliminated from consideration if they are outside a preset minimum or maximum value on any of the dimensions.

13. The evaluation tool of claim 1, wherein, in order to be selected, a historical account record must not be outside a preset minimum or maximum normalized distance on any one of the dimensions.

14. The evaluation tool of claim 1, wherein at least one of the dimensions is weighted in the calculation of the normalized distance.

15. The evaluation tool of claim 1, wherein the historical accounts database comprises historical accounts within a single firm.

16. The evaluation tool of claim 1, wherein the historical accounts database comprises historical accounts from a plurality of firms.

17. The evaluation tool of claim 1, wherein the first computer prompts a user to elect whether to compare the proposed account to historical accounts within a single firm or a plurality of firms.

18. The evaluation tool of claim 1, wherein the first computer prompts a user to elect whether to compare the proposed account to historical accounts of professionals similar to the professional.

19. The evaluation tool of claim 18, wherein, prior to identification of the nearest neighbor historical accounts for a proposed account, the second processor prompts a user to filter the historical account records on the basis of at least one of: book assets, book revenue, years of service or recognition level.

20. The evaluation tool of claim 1, wherein the historical accounts database is presegmented to consider accounts only within a same country or within a same currency.

* * * * *